Feb. 5, 1935. V. G. APPLE 1,989,672
ELECTRIC BRAKE
Filed June 13, 1928 3 Sheets-Sheet 1
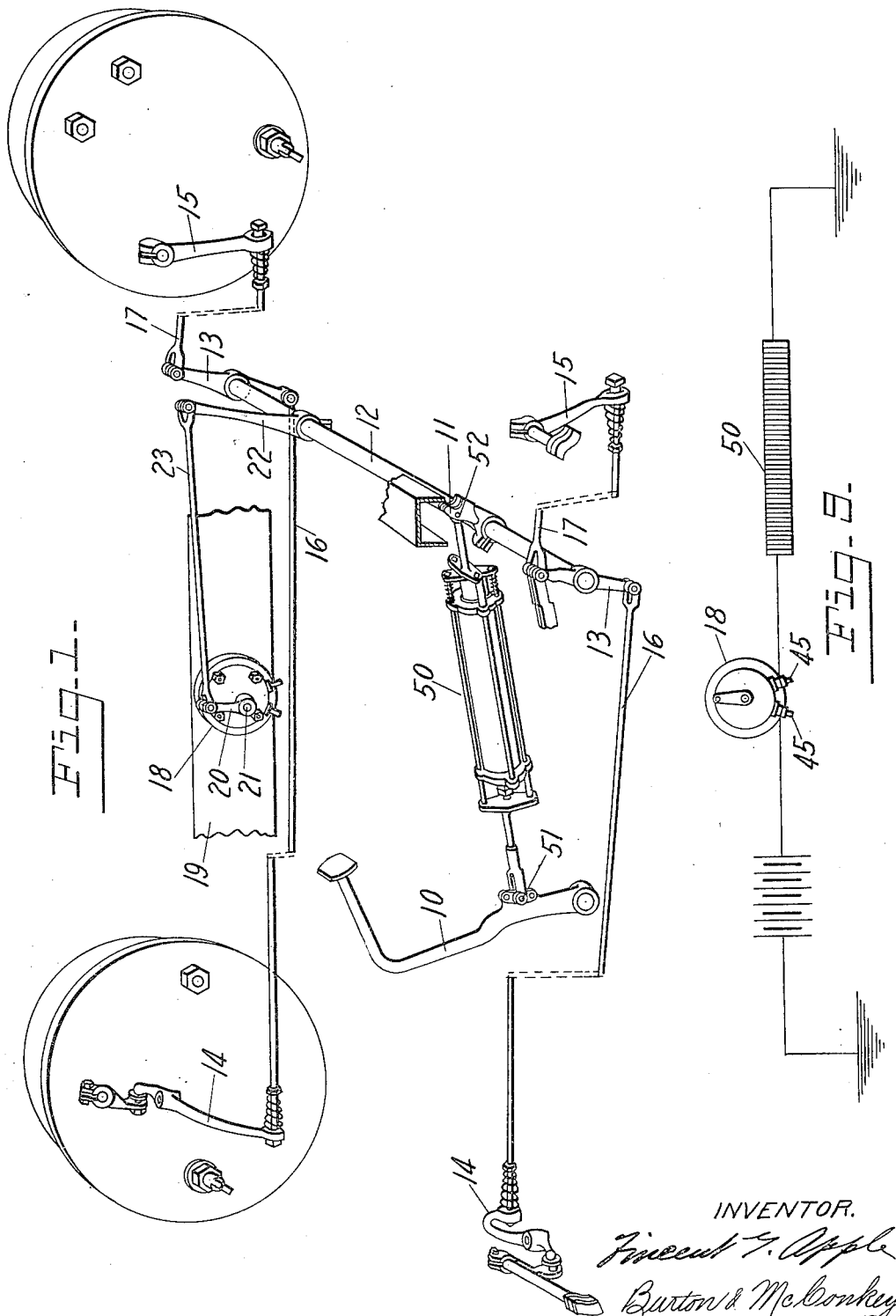
INVENTOR.
Vincent G. Apple
Burton & McConkey
ATTORNEYS

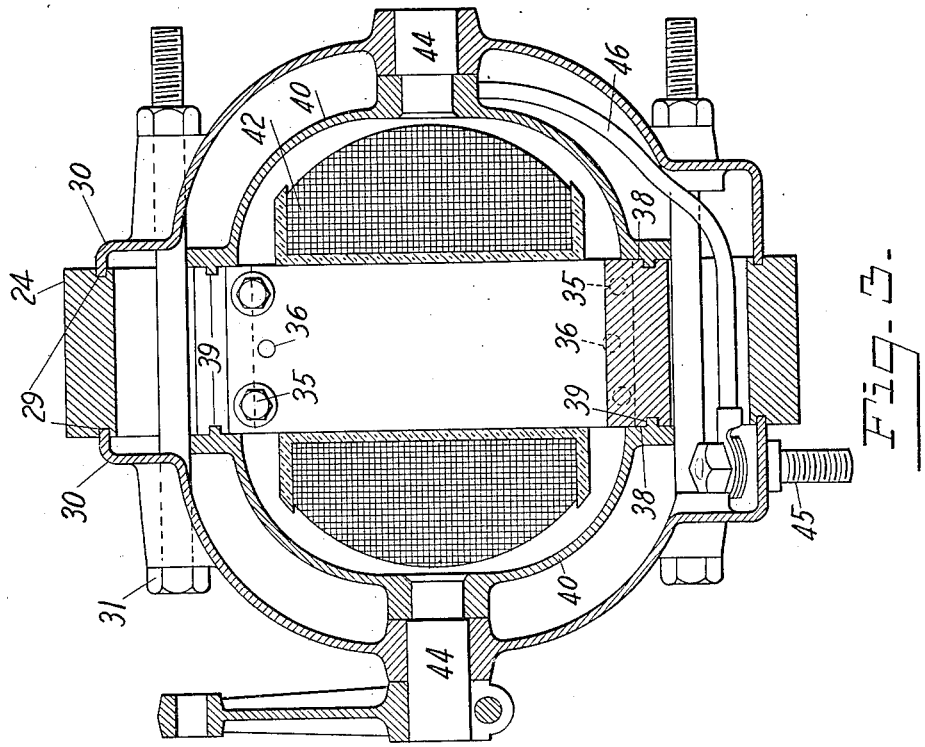
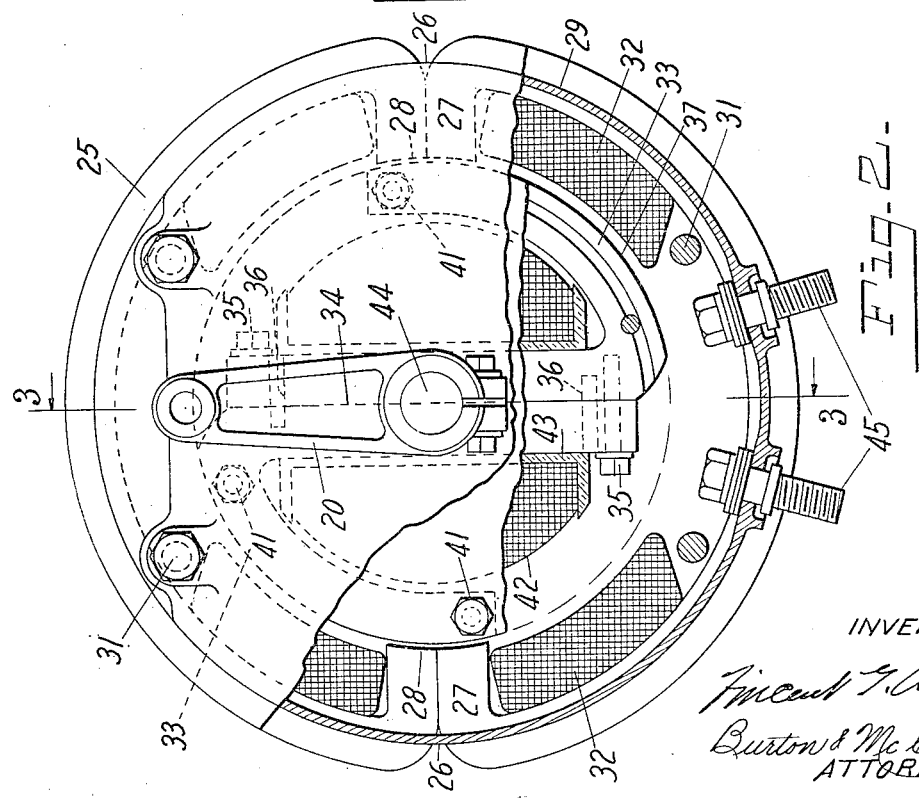

Feb. 5, 1935. V. G. APPLE 1,989,672
ELECTRIC BRAKE
Filed June 13, 1928 3 Sheets-Sheet 3
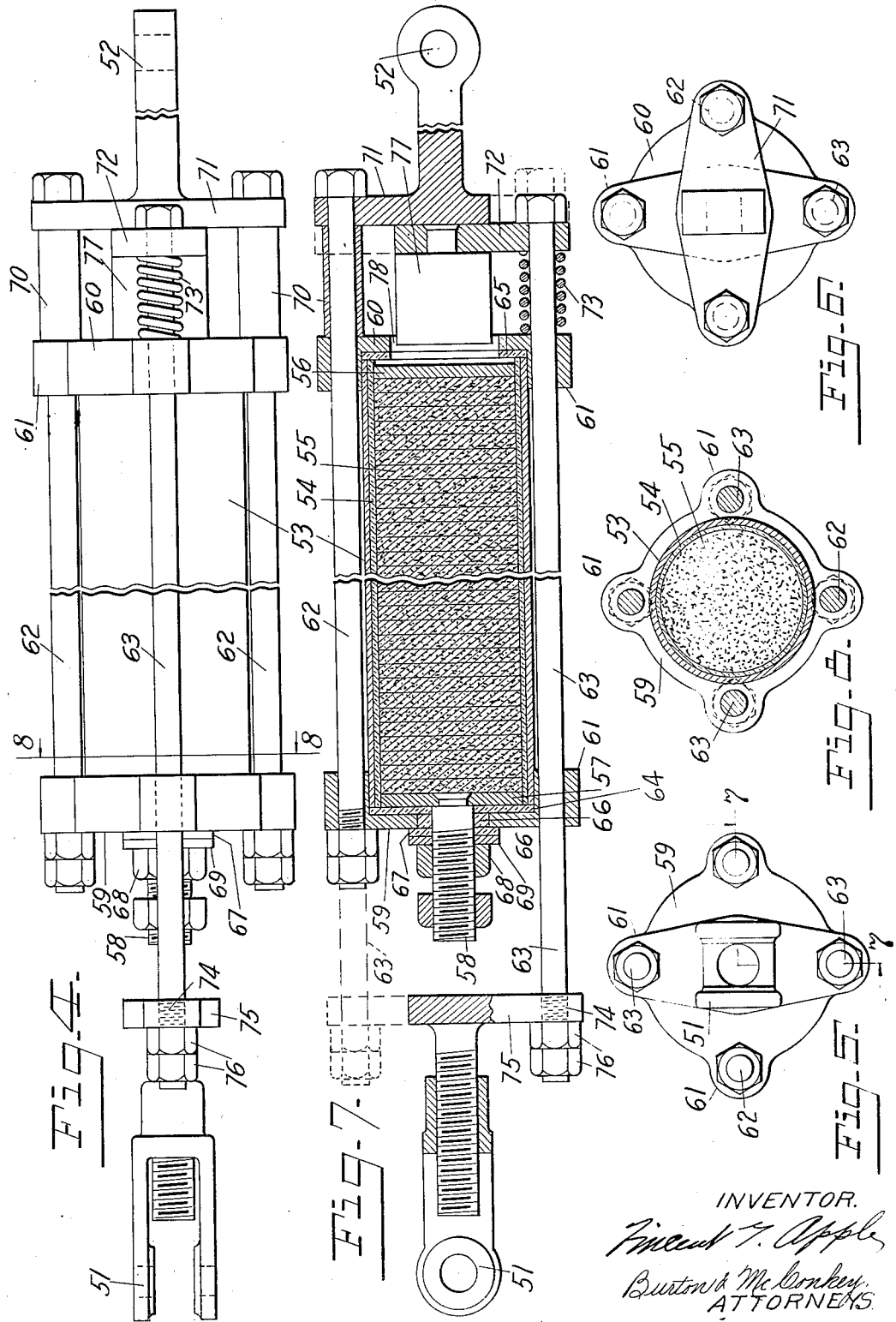
INVENTOR.
Vincent G. Apple
Burton & McConkey
ATTORNEYS Patented Feb. 5, 1935

1,989,672

UNITED STATES PATENT OFFICE 1,989,672

ELECTRIC BRAKE

Vincent G. Apple, Dayton, Ohio, assignor to Bendix Brake Company, South Bend, Ind., a corporation of Illinois Application June 13, 1928, Serial No. 285,089

9 Claims. (Cl. 188—156)

My invention relates to a type of braking mechanism usually known as a servo mechanism of which the so-called booster brake is a type and wherein braking effort may be exerted manually, whereupon power effort will be automatically added and in proportion to the amount of manual effort being exerted.

An object of my invention is to provide in servo brake mechanism a power device capable of operating the brakes and particularly adapted to supplement the manual brake applying effort, which power device is so constructed and arranged as to supplement said manual brake applying effort in direct proportion to the amount of effort exerted by the driver.

My improved power device is preferably of the electric type and an important feature resides in the provision of an oscillating electric power device having a brake applying part suitably connected with the brakes, which part swings through a limited arc to apply the brakes and exerting a force which is a function of the brake applying pressure placed by the driver upon a manually operable brake applying member.

An object of importance is the provision of an improved controller for the power device which is interposed as a tension transmitting part of the mechanical linkage connecting the manually operable brake applying member with the brakes for direct mechanical operation by the driver, which controller regulates the brake applying effort of the power devices in direct proportion to the brake applying tension transmitted thereby as a part of such mechanical linkage.

A further object of my invention is to provide a part turn motor such as an electromagnet to assist the manual brake applying means, and to so construct said manual means that a variation in the energy applied to manually operate the brakes will vary the amount of electrical energy flow through the winding of the electromagnet.

The above objects and others, together with various advantages and meritorious features of my invention will more fully appear from the following description, appended claims and accompanying drawings, wherein:

Fig. 1 is a perspective view of the braking linkage of an automotive vehicle, with my improved mechanism added thereto.

Fig. 2 shows, to an enlarged scale, the electromagnet power device shown in Fig. 1, the view being partly in elevation and partly in vertical section.

Fig. 3 is a vertical section taken on line 3—3 of Fig. 2.

Fig. 4 is a plan view, to an enlarged scale, of the motor controller shown in Fig. 1.

Figs. 5 and 6 are front and rear end views respectively of the motor controller.

Fig. 7 is a right angle cross section taken at 7—7 of Fig. 5.

Fig. 8 is a cross section taken at 8—8 of Fig. 4.

Fig. 9 is a diagram of the electric circuit.

For purposes of illustration in Fig. 1 I show a linkage such as is being used commercially to operate the four wheel brakes of an automotive vehicle, and the motor 18 and motor controller 50 which combines with the linkage to compose the present invention.

Referring to the drawings, 10 is the brake pedal which in ordinary practice is connected through a plain rod to lever 11 on cross shaft 12, so that movement of the pedal will turn the cross shaft through a small part of a revolution, to the end that the levers 13 secured to the ends of the cross shaft may operate the brake arms 14 and 15 through rods 16 and 17 respectively. The spring means usually employed to return the pedal to its starting point is omitted for clearness.

In my improved structure a motor 18 is secured to the side frame 19 or other suitable part of the chassis. A short arm 20 on the motor shaft 21, and a relatively longer arm 22 on cross shaft 12 are connected by rod 23. The motor shaft 21 is adapted to oscillate through somewhat less than a half revolution while the cross shaft 12 need not operate through more than twenty to thirty degrees whereby the torque applied to the cross shaft may be several times that produced by the motor.

Since the motor is required to operate through part only of a revolution, no commutator or brushes, such as are used in a motor whose armature has continuous rotation, are required, the current being conveyed instead to both armature and field windings through leads connecting the coils to the binding posts.

A bipolar field core is formed by providing two substantially equal iron bars of rectangular cross section 24 and bending them as at 25, welding the two bent bars together and filling them in as at 26, boring the poles 27 thus formed as at 28, and grooving the edges of the bars as at 29 to concentrically support the bearing heads 30. (See Figs. 2 and 3.) Bolts 31 hold the bearing heads in place and suitably formed field coils 32 surround poles 27 to produce the field flux.

The armature core is formed by providing two substantially equal iron bars of rectangular cross section and bending them to the form 33, machining the surfaces to make a magnetic joint at 34, joining them by screws 35 and dowels 36, then turning the outer diameter 37, the edge 38, and the annular grooves 39 which concentrically locate the journal heads 40.

Screws 41 secure the journal heads 40 to the armature core, and a coil 42 wound on a spool 43 of insulating material surrounds the core, the entire armature structure being thus adapted to oscillate on journals 44 secured in journal heads 40.

The leads from both field and armature windings connect to binding posts 45, the flexible leads 46 being brought from coil 42 through head 40 as near as possible to its center of rotation, so that the armature may oscillate through a considerable portion of a turn without greatly flexing the lead.

By suitable proportion of arms 21 and 22 the rotation of the motor may be limited to approximately ninety degrees, in which case it is apparent that the torque produced on cross shaft 12 will not vary greatly at different parts of its movement as it would be if it were operated by an ordinary magnet wherein movement is created by permitting a decrease in an air gap in the magnetic circuit. While the oscillating motor herein shown and described is particularly applicable to the braking system which is the subject of this application it is not herein claimed, but is made the subject of a separate application simultaneously copending herewith, and while I prefer to use this type of electromagnet device in connection with the present invention, electromagnet devices of other forms may be employed if desired.

Having provided and arranged the motor 18 to operate in conjunction with brake pedal 10 so that electrical effort and manual effort may operate together to turn cross shaft 12, the controlling means 50 is connected in the electric circuit to keep the electrical effort at all times proportional to the manual effort being exerted.

The controller hinges on pedal 10 at 51 and on lever 11 at 52 and is so constructed that when pressure on pedal 10 puts the controller in tension the resistance of the electrical circuit is lowered, the current increased, and the electrical effort in consequence augmented.

For the controller (see Figs. 4 to 8 inclusive), a length of tubing 53 is lined with insulation 54 and filled with graphite discs 55, a plain metal end disc 56 and another metal end disc 57 having a binding post 58 secured thereto by riveting as shown. Metal caps 59 and 60, having ears 61 for bolts 62 and 63, telescope and enclose the ends of the tube, and insulation washers 64 and 65 both of a diameter equal to the outside of tube 53 cover its ends before caps 59 and 60 are put on.

Binding post 58 is insulated from metal cap 59 by insulation washers 64, 66 and 67 while nut 68 bearing against metal washer 69 secures the binding post to the cap.

Bolts 62 extending through ears 61 hold caps 59 and 60 rigidly against the ends of tube 53, and the bolts have sufficient additional length to extend also through small spacing tubes 70 and through the holes in member 71 to hold it in fixed relation to the tube 53 yet spaced apart therefrom.

Bolts 63 somewhat longer than bolts 62 extend through holes in plate 72 through springs 73, slidably through ears 61, then into tapped holes 74 in member 75 to which they are further secured by lock nuts 76.

Plate 72 has metal contact plug 77 riveted thereto. This plug may extend through opening 78 in end cap 60 to make contact with metal end disc 56 when springs 73 are suitably depressed from pressure on brake pedal 10.

In operation brake pedal 10 is manually depressed putting controller 50 in tension so that springs 73 yield and plug 77 contacts disc 56 and brings the surfaces of graphite discs 55 together completing the circuit shown diagrammatically in Fig. 9.

If now the electric current by any chance fails, the operator may go on and apply the brakes manually in the usual manner, but with the battery in proper condition current passes through the motor and the motor energy adds its braking effort to the manual effort.

If the operator increases his pressure on the pedal he increases the manual braking effort but this at the same time further compresses the graphite discs and further increases the motor effort. But the motor effort may at no time act ahead of the manual effort, for, to do so it must necessarily remove the tension from the controller which instantly reduces the current through the motor.

While the controller shown is particularly applicable to this invention, in that it provides a stepless variation of the resistance to the electrical circuit through a wide range without the arcing which would occur in a series parallel or resistance coil controller, it is not herein claimed but is made the subject of a separate application simultaneously copending herewith.

From the foregoing description it is apparent that, with my improved brake, the operator has manual control of the brakes if the electrical current by any chance fails, and that, with a suitable source of current properly connected, and with the motor and controller correctly proportioned, he may at all times have added to his manual braking effort a predetermined multiple or fraction thereof in electrical effort, to the end that the operator is relieved of the hard labor incident to frequent brake application, yet does not lose his sense of control, in that he still finds that the brakes are applied in proportion as he varies his manual effort, even though his manual effort may be at any time but a fraction of that required with ordinary manual brakes.

I claim:

1. Braking mechanism comprising, brakes, an electric power device to apply said brakes, a source of electric current supply to operate said device, a resistance controller to regulate said current supply having a plurality of conductive elements in indifferent contact, a manually operable lever attached to said controller to improve the contact between said conductive elements by manual pressure thereon, said controller serving as mechanical linkage whereby said manually operable lever may manually operate said brakes.

2. Brake mechanism comprising brakes, an electric power machine having a part connected with the brakes to apply the same and adapted to be swung through a limited arc with a force depending upon the current received by the machine, manually operable brake applying mechanism connected with the brakes to apply the brakes and including a pressure responsive controller through which the brake applying effort is mechanically transmitted, said controller coupled with the electric power machine to regulate the supply of current to the machine in direct proportion to the brake applying effort mechanically transmitted by the controller.

3. Brake mechanism comprising, brakes, manual brake applying means having linkage leading to the brakes, an electric power device to assist said manual means, and a controller for said power device forming a part of said linkage, said controller having a series of conductive parts in indifferent contact but which are brought into improved contact to increase the power delivered by the power device as the tension in the linkage to apply the brakes manually is increased.

4. The combination in a braking mechanism, of brakes, a manual means to apply said brakes, an electric power machine to assist said manual means, and a device having a plurality of graphite discs in contact through which current is conveyed for operating the power machine and through which the manually exerted pressure is transmitted to manually operate the brakes.

5. A vehicle braking system having in combination, brakes, a brake pedal to operate said brakes, a part turn motor to assist said brake pedal, a graphite disc resistor to regulate the current for said motor, said resistor being so located that pedal pressure compresses the discs to increase the motor effort and to manually apply the brakes.

6. Brake mechanism comprising, in combination, brakes, electric power means to apply the brakes, manual means to apply the brakes including a yielding tension transmitting conductor electrically coupled with the power means to vary the brake applying effort thereof as the brake applying effort of the manual means is varied.

7. Brake mechanism comprising, in combination, brakes, electric power means to apply the brakes, manual operating means to apply the brakes including a manual operating member and a yielding tension transmitting electrical conductor interposed as a part of the tension transmitting connection between said operating member and the brakes adapted to serve as an electric controller and operable to vary the brake applying effort of the electric power means in proportion to the manual effort exerted on the operating member.

8. Brake mechanism comprising, in combination, brakes, electric power means to apply the brakes and manual means to apply the brakes including a yielding tension transmitting conductor, constituting a portion of the power transmission line whereby the power operable to apply the brakes varies directly in proportion to the tension created by the actuation of the manual means.

9. Vehicle brake mechanism comprising, in combination, brakes, a brake pedal, a brake applying shaft, connections leading from the shaft to the brakes, an electric power device coupled with the shaft to exert a brake applying torque thereupon, a yielding variable electric conductor having pivotal connection at one end with the pedal and at the opposite end with the shaft to mechanically transmit brake applying torque from the pedal to the shaft, said conductor included in the electric circuit with the power device to vary the torque delivered thereby to the shaft.

VINCENT G. APPLE.